United States Patent Office 2,727,906
Patented Dec. 20, 1955

2,727,906
PREPARATION OF 7-BROMOCHOLESTEROL ESTERS

Richard B. Hasbrouck and Marvin A. Spielman, Waukegan, and Kenneth E. Hamlin, Lake Bluff, Ill., assignors to Abbott Laboratories, North Chicago, Ill., a corporation of Illinois No Drawing. Application March 12, 1951,
Serial No. 215,192

1 Claim. (Cl. 260—397.2)

The present invention relates to an improvement in chemical processes, and more particularly to an improvement in the Wohl-Ziegler reaction. The Wohl-Ziegler bromine substitution reaction permits bromination of an "allylic" structure to substitute a bromine atom in the "allyl" position as shown by the following equation:

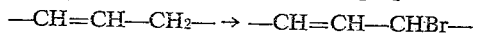

Normal bromination of this type of structure would proceed to add two atoms of bromine across the double bond to saturate the ethylenic linkage.

Our invention utilizes an improvement in the Wohl-Ziegler bromination reaction of an "allylic" structure using N-bromosuccinimide as the brominating agent, and an alkyl or aralkyl hyponitrite ester as a catalyst.

It is known to the prior art to brominate the "allylic" structure by substituting bromine in the carbon atom most saturated using N-bromo-succinimide and refluxing the mixture in a hydrocarbon solvent, such as carbon tetrachloride, either in the presence of strong light or in the presence of a chemical catalyst, usually dibenzoyl peroxide. In commercial production these sources of catalysis have been found unsatisfactory for several reasons. It is both expensive and impractical to use transparent or glass reaction vessels so that light may be used for illumination. Even where a glass or transparent reaction vessel is used in large scale reactions, the large volume of solution hinders effective radiation due to its opacity. The prolonged irradiation and heating of the bromination mixture is quite often detrimental to good yields and the quality of the brominated product. This loss of yield is particularly undesirable in the case of steroidal compounds which are relatively expensive. When the usual chemical catalysts, such as dibenzoyl peroxide, are used, the yields are usually substantially smaller, and the time of reaction is considerably longer than is required with the use of the process of the present invention.

We have discovered that with the use of catalytic amounts of alkyl and aralkyl hyponitrite esters, even large scale reactions are usually completed in about 5 minutes, whereas with illumination or with the use of dibenzoyl peroxide, or other chemical catalysts, the time for complete reaction usually ranges from at least 12 minutes to as much as 45 minutes.

We have discovered that with the use of alkyl and aralkyl hyponitrite esters as the catalyst, the yields are substantially greater than those obtained using illumination or other chemical catalysts.

We have also discovered that alkyl and aralkyl hyponitrite esters aid in the direction of the substitution of the bromine to the "allyl" position. This, of course, limits the amount of side reaction products obtained, and obviates expensive and difficult purification problems. This is particularly important in the production of the highly expensive steroidal compounds. We have discovered that our process may be used to substitute bromine in the "allyl" position in compounds having the "allylic" structure in either cyclic or aliphatic form.

We have also discovered that our process may be used in conjunction with dehydrobromination to convert an "allylic" structure to a diene structure. The latter will be shown in several of the examples which follow.

Our process uses as a catalyst the alkyl and aralkyl alcohol esters of hyponitrous acid. As examples of the catalysts which may be used successfully in our process are the esters of methyl, ethyl, n-propyl, n-butyl, allyl, oleyl, cetyl, stearyl, ceryl, benzyl, and α-naphthylmethyl alcohols. Because of ease of production, the lower aliphatic alcohol and benzyl alcohol esters are preferred. Because of its chemical and physical properties, we prefer to use benzyl hyponitrite. These esters are somewhat unstable, and must be stored at reduced temperatures. They may be prepared by first producing sodium hyponitrite and converting this to silver hyponitrite by mixing equimolar quantities of dilute aqueous solutions of the alkali-metal hyponitrite and of silver nitrate. The alkyl or aralkyl ester may be prepared by treating the dried silver hyponitrite with a dry alkyl or aralkyl iodide in an ether solution. The hyponitrite ester is obtained by filtering the reaction solution and then concentrating and cooling to cause crystallization. The product is filtered, washed with low boiling hydrocarbon solvent and dried in vacuum in the cold. In the case of benzyl hyponitrite, the ester may be stored at 0–5° C. for several weeks without decomposition.

In our process only small quantities of catalyst are necessary to catalyze the Wohl-Ziegler reaction. For example, when benzyl hyponitrite is added to a boiling carbon tetrachloride or benzene or other inert solvent solution of an "allylic" compound, a vigorous bromination reaction is quickly initiated which will proceed to completion in a few minutes to give the desired product in good yields and quality. When using the catalyst no light is necessary. The reaction mixtures may be purified in the usual manner for the Wohl-Ziegler reaction which calls for cooling the reaction mixture, filtering off the succinimide by-product, and concentrating the filtrate to a residue in vacuum. The product is then isolated by crystallization or distillation.

We have found the hyponitrite ester catalysts particularly advantageous in the bromination of steroidal compounds having the "allylic" structure, but the application of our process may be extended to other compounds having this structure or other active structures (e. g. Ex. IX) such as esters of crotonic acid, fluorene, pinene, alkyl thiophenes and the like.

In order more clearly to disclose the nature of the present invention, several specific examples illustrating the preparation of typical compounds will hereinafter be described. It should be understood, however, that this is done solely by way of example and is intended neither to delineate the scope of the invention nor limit the ambit of the appended claim.

EXAMPLE I

*Conversion of cholesteryl benzoate to 7-bromocholesteryl benzoate*

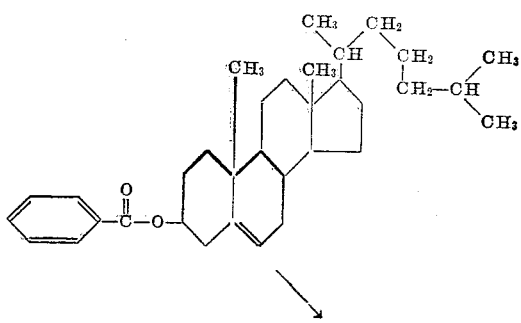

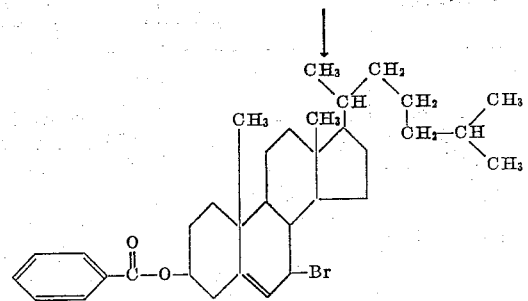

To a gently refluxing solution of about 12.25 gms. of cholesteryl benzoate and 4.5 gms. N-bromosuccinimide in 200 ccs. dry benzene is added a solution of 0.02 gm. benzyl hyponitrite in 2ccs. benzene. A vigorous reaction quickly begins and is completed in one minute. The reaction is immediately cooled in ice and 0.5 cc. of pyridine added. The reaction mixture is filtered from succinimide at about 5° C. and the filtrate concentrated under reduced pressure at about 30° C. to a thick yellow syrup. The residue is dissolved in 100 cc. of carbon tetrachloride, filtered from traces of succinimide and concentrated in vacuum to a viscous syrup. Trituration of the residue with about 20 ccs. of warm acetone causes crystallization to occur. After thorough cooling in ice, the mixture is filtered, the solid washed with 3–15 cc. portions of ice-cold acetone and dried in vacuum. The yield of 7-bromocholesteryl benzoate is 9.78 gms., or 68.8% of the theoretical, melting at 136.5–137.5° C. Bide, Henbest et al. (J. Chem. Soc., 1948, 1787) report a yield of 33.3%.

In place of the benzoyl group in the above example, one may use aliphatic acyl groups, such as acetyl, propionyl, and butyryl derivatives in which case the compounds produced are 7-bromocholesteryl acetate, propionate, and butyrate, respectively.

A solution of about 450 gms. of 3($\alpha$)-acetoxy-11-keto-12-bromo-24,24-diphenyl-$\Delta^{23}$-cholene in 9 liters of dry benzene is heated to gentle boiling and 133.4 gms. of N-bromosuccinimide is carefully added. The solution is reheated to a gentle boil and a solution of 0.45 gm. of benzyl hyponitrite in 10 ccs. of dry benzene is added. A vigorous reaction quickly starts and is completed in 3 to 4 minutes. The reaction mixture is cooled to 25–30° C., washed twice with water to remove succinimide and then dried with anhydrous magnesium sulfate. The dried solution is boiled under reflux for about 18 hours to effect dehydrobromination. This solution is then distilled at atmospheric pressure to a volume of about five liters. To the hot solution is added 133.4 gms. of N-bromosuccinimide, the solution reheated to a gentle boil and a solution of 0.45 gm. of benzyl hyponitrite in 10 ccs. of benzene is added. A fairly vigorous reaction soon begins and is complete in about 5 minutes. The reaction is cooled to room temperature, washed with water and dried over anhydrous magnesium sulfate. The resulting solution is concentrated under reduced pressure at 20–40° C. to a viscous, semi-solid residue. To the residue is added 2 liters of anhydrous ether and the mixture is stirred and refluxed for 15–30 minutes until all the oil has crystallized. The mixture is cooled at about 0° C. overnight, the product filtered off and washed with three or four portions of petroleum ether (boiling point 60–80°). After being dried, the product, 3($\alpha$)-acetoxy-11-keto-12,21-dibromo-24,24-diphenyl-$\Delta^{20,23}$-choladiene, is a white, crystalline solid melting at 215–217° C. The yield is 34.6 gms., or 68.6% of the theoretical amount. Concentration of the mother liquor yields an additional 52 gms., melting at 203–205° C. The total yield is 39.8 gms., or 79% of the theoretical.

EXAMPLE II

*Conversion of 3($\alpha$)-acetoxy-11-keto-12-bromo-24,24-diphenyl-$\Delta^{23}$-cholene to 3($\alpha$)-acetoxy-11-keto-12,21-dibromo-24,24-diphenyl-$\Delta^{20,23}$-choladiene*

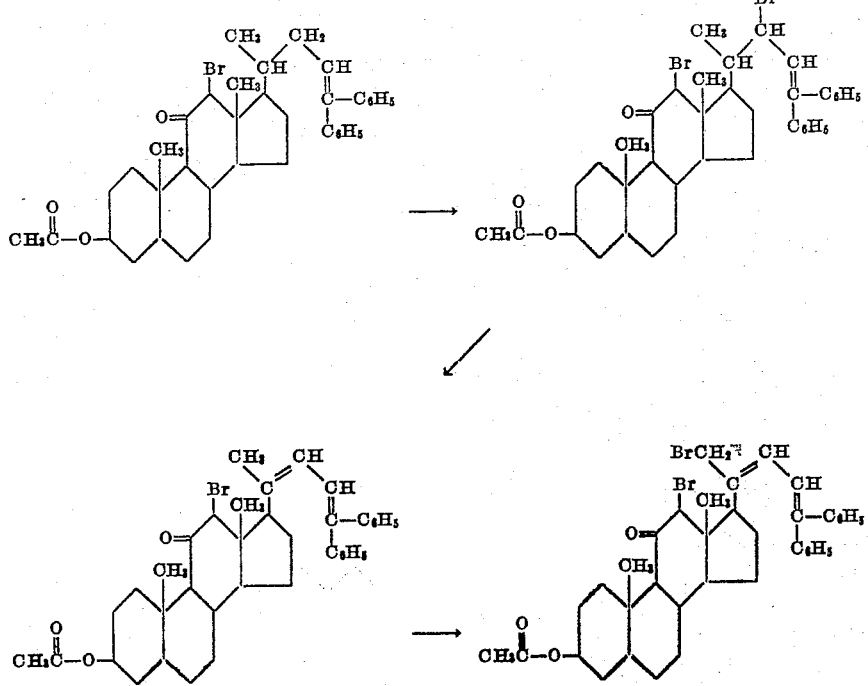

EXAMPLE III

*Conversion of 3(α),12(α)-diacetoxy-24,24-diphenyl-Δ²³-cholene to 3(α),12(α)-diacetoxy-24,24-diphenyl-Δ²⁰,²³-choladiene*

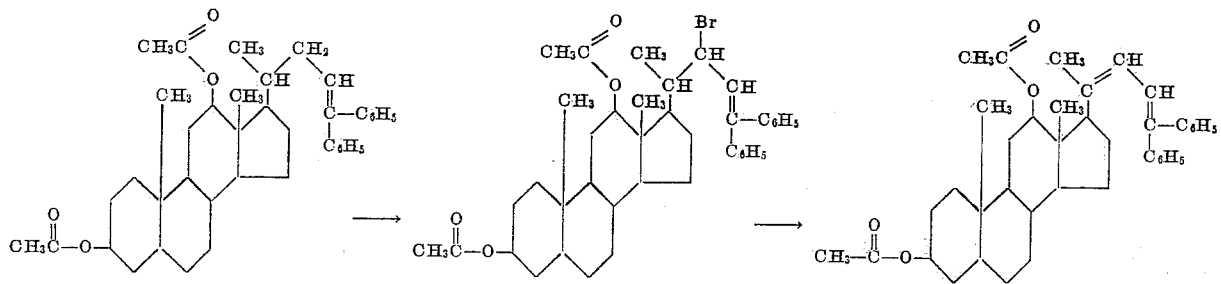

To a gently boiling solution of about 11.94 gms. of 3(α),12(α)-diacetoxy-24,24-diphenyl-Δ²³-cholene in 240 ccs. of dry benzene is added 3.60 gms. of N-bromosuccinimide. The solution is quickly reheated to boiling and a solution of 0.03 gm. of benzyl hyponitrite in 6 ccs. of benzene added over a period of about one minute. During this time, a vigorous reaction takes place and the reaction is over in one minute. The mixture is cooled to 25–30° C., washed with water and dried by distilling off a little of the benzene. The resulting solution is boiled under reflux overnight to complete the dehydrobromination. It is then distilled to about one-half its volume to remove traces of hydrogen bromide and the remaining solvent removed under reduced pressure. The resulting syrupy residue is dissolved in 15 ccs. of acetone by warming, allowed to crystallize and then cooled at about 0° C. overnight. The solid is then filtered off, washed with 3–10 cc. portions of a mixture of equal volumes of acetone and methanol, then with 2–10 cc. portions of methanol and dried. The crude crystalline product, 3(α),12(α)-diacetoxy-24,24-diphenyl-Δ²⁰,²³-choladiene, melts at 130–132° C. The yield is 8.99 gms., including a second crop of 0.30 gm. Recrystallization of the crude material from acetone gives 8.45 gms. (71% of theoretical) of product melting at 134–136° C.

EXAMPLE IV

*Conversion of 3,9-epoxy-11-keto-24,24-diphenyl-Δ²³-cholene to 3,9-epoxy-11-keto-24,24-diphenyl-Δ²⁰,²³-choladiene*

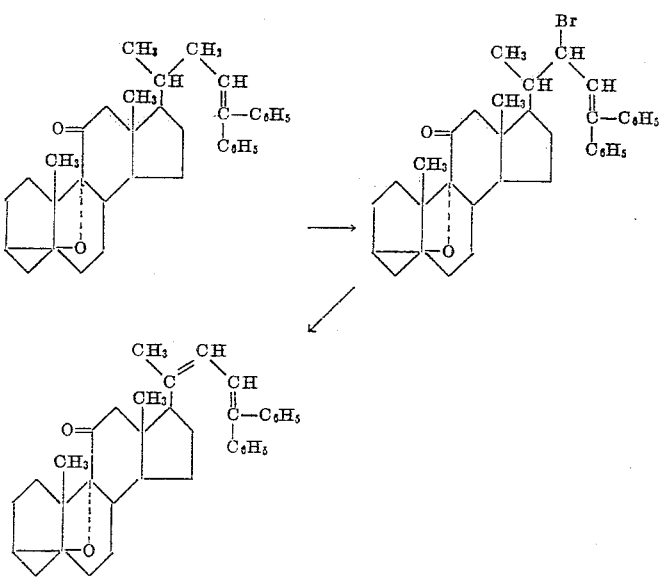

To a boiling solution of about 10.16 gms. of 3,9-epoxy-11-keto-24,24-diphenyl-Δ²³-cholene in 250 ccs. of dry benzene is added 3.74 gms. of N-bromosuccinimide. The solution is quickly reheated to boiling and a solution of 0.01 gm. benzyl hyponitrite in 2 cc. of dry benzene is added. An immediate reaction takes place and is completed in about 3 minutes. The hot reaction solution is poured into water, washed well with water and the benzene layer separated and dried with anhydrous magnesium sulfate. The benzene solution is boiled under reflux overnight to effect the dehydrobromination. It is then concentrated to a residue under reduced pressure and the residue triturated with warm acetone to complete crystallization. The solid is filtered off, washed with acetone and dried. The first crop of product weighs 4.90 gms. and melts at 224–226° C. The second crop of 3.75 gms. melts at 210–211° C. The total yield is 8.65 gms. (85% of theoretical) of crude 3,9-epoxy-11-keto-24,24-diphenyl-Δ²⁰,²³-choladiene. It may be recrystallized from a fairly large volume of acetone to give colorless needles melting at 236–238° C.

EXAMPLE V

*Conversion of ethyl crotonate to ethyl γ-bromocrotonate*

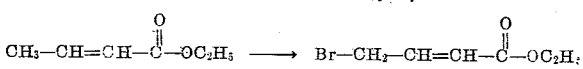

To a boiling solution of about 16.7 gms. of ethyl crotonate in 150 ccs. of carbon tetrachloride is added 26.5 gms. of N-bromosuccinimide. The mixture is reheated to reflux and a solution of 0.10 gm. of benzyl hyponitrite in 20 ccs. of carbon tetrachloride is added dropwise to the reaction over a period of 15 minutes, after which time the reaction is complete, as evidenced by the absence of unchanged N-bromosuccinimide at the bottom of the flask.

The reaction is cooled, filtered from succinimide and the filtrate stripped of solvent in vacuum. The residual oil is distilled in vacuum to yield 22.8 gms. (81% of the theoretical) of ethyl γ-bromocrotonate boiling at 105–110° C. at 15 mm. pressure, $n_D^{20}=1.4925$.

EXAMPLE VI

*Conversion of fluorene to 9-bromofluorene*

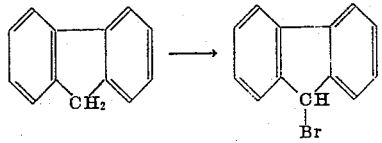

To a boiling solution of about 5.0 lbs. of fluorene in 17.5 liters of dry benzene is added 5.5 lbs. of N-bromosuccinimide. The reaction is reheated to reflux and a solution of 2.5 gms. of benzyl hyponitrite in 50 ccs. of benzene is added over a period of 2 minutes. The reaction solution is refluxed for an additional 15 minutes, poured into water, separated and washed twice more with water. The benzene is removed by distillation under reduced pressure to give a reddish-colored residue. Recrystallization of the residue from alcohol gives 3.6 lbs. of 9-bromofluorene melting at 99–100° C. A second crop of 2.5 lbs. of the crystals melting at 113.5–114° C., consisting of unchanged fluorene, is also obtained. The yield of product, taking into account recovered starting material, is 51.5% of the theoretical.

EXAMPLE VII

*Conversion of α-pinene to 6-bromo-α-pinene*

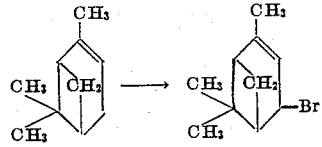

To a gently refluxing solution of about 50 gms. of α-pinene and 25 gms. of N-bromosuccinimide in 500 ccs. of carbon tetrachloride is added a solution of 0.15 gm. of benzyl hyponitrite in 10 ccs. of carbon tetrachloride over a period of about 4 minutes. A quite vigorous reaction occurs. After a total of 10 minutes of refluxing, the reaction mixture is cooled, filtered from succinimide and the solvent removed in vacuum. The residual oil is distilled in vacuum to yield 20 gms. (66.5% of the theoretical, based on N-bromosuccinimide) of 6-bromo-α-pinene boiling at 87–92° C. at 12 mm. pressure ($n_D^{23}=1.5182$).

EXAMPLE VIII

*Conversion of 2-methylthiophene to 2-bromomethyl thiophene*

To a refluxing solution of about 19.63 gms. of 2-methylthiophene and 36.0 gms. of N-bromosuccinimide in 100 ccs. of carbon tetrachloride is added dropwise a solution of 0.10 gm. of benzyl hyponitrite in 20 ccs. of carbon tetrachloride over a period of 12 minutes. At this time, all of the N-bromosuccinimide has been consumed and the reaction is cooled and filtered. The filtrate is concentrated in vacuum and the residual oil distilled at a pressure of 1.5 mm. Three fractions are obtained:

I. 2.7 gms., B. R. 43–55° C., $n_D^{20}=1.5890$
II. 5.4 gms., B. R. 55–60° C., $n_D^{20}=1.6020$
III. 16.83 gms., B. R. 60–65° C., $n_D^{20}=1.6052$ Fractions II and III represent a yield of 22.23 gms. (63% of the theoretical) of 2-bromomethyl thiophene.

EXAMPLE IX

*Conversion of 3-methylthiophene to 2-bromo-3-methylthiophene*

To a boiling solution of about 27.5 gms. of 3-methylthiophene and 44.3 gms. of N-bromosuccinimide in 75 ccs. of carbon tetrachloride is added dropwise a solution of 0.10 gm. of benzyl hyponitrite in 30 ccs. of carbon tetrachloride over a period of 30 minutes. After this time the reaction is complete and the mixture is cooled, filtered and the solvent stripped off in vacuum. The residual oil is distilled in vacuum and 31.17 gms. (72% of the theoretical) of 2-bromo-3-methylthiophene boiling at 70–100° C. at 2 mm. pressure is obtained. Redistillation of the product results in a 90–95% recovery of material of refractive index $n_D^{20}=1.5760$.

In place of benzyl hyponitrite in the above examples other alkyl and aralkyl alcohol esters of hyponitritous acid may be used. Examples of these esters are methyl hyponitrite, ethyl hyponitrite, n-propyl hyponitrite, n-butyl hyponitrite, allyl hyponitrite, oleyl hyponitrite, cetyl hyponitrite, stearyl hyponitrite, ceryl hyponitrite, and α-naphthylmethyl hyponitrite.

Others may readily adapt the invention for use under varying conditions of service, by employing one or more of the novel features disclosed, or equivalents thereof. As at present advised with respect to the apparent scope of our invention, we desire to claim the following subject matter.

We claim:

The process of preparing a 3-acyloxy-7-bromocholesterol, which comprises brominating a 3-acyloxy derivative of cholesterol with N-bromosuccinimide in the presence of benzyl hyponitrite.

References Cited in the file of this patent

Brande: Nature 164, 241 (1949).
Djerassi: Chem. Reviews, 43, 271–317, particularly pp. 291–95 (1948).